No. 827,318. PATENTED JULY 31, 1906.
M. MARTIN.
FLUID GAGE.
APPLICATION FILED FEB. 23, 1906.
2 SHEETS—SHEET 1.
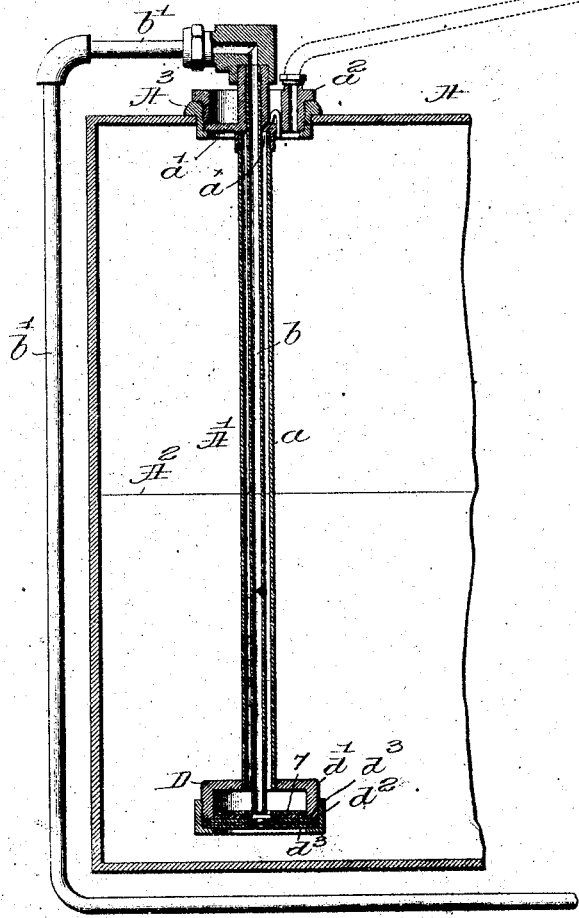
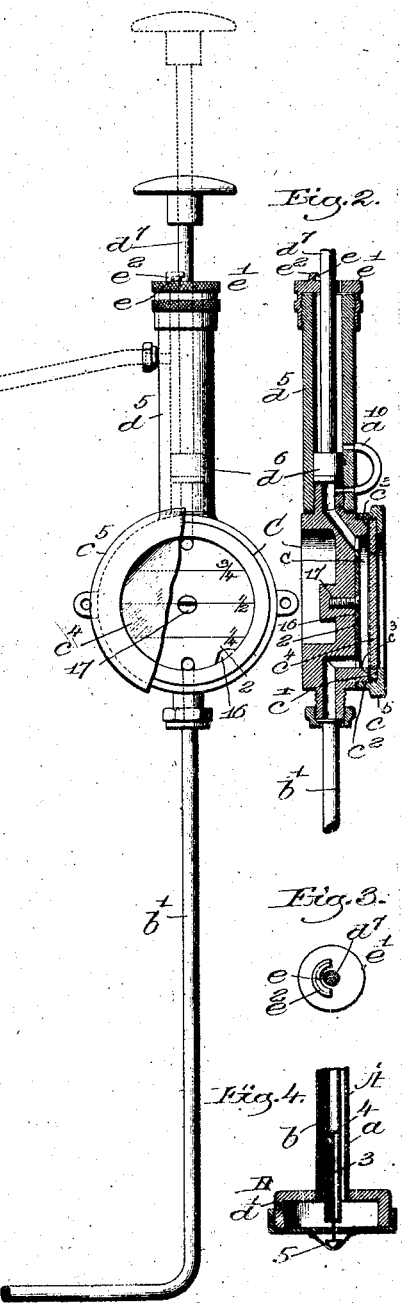

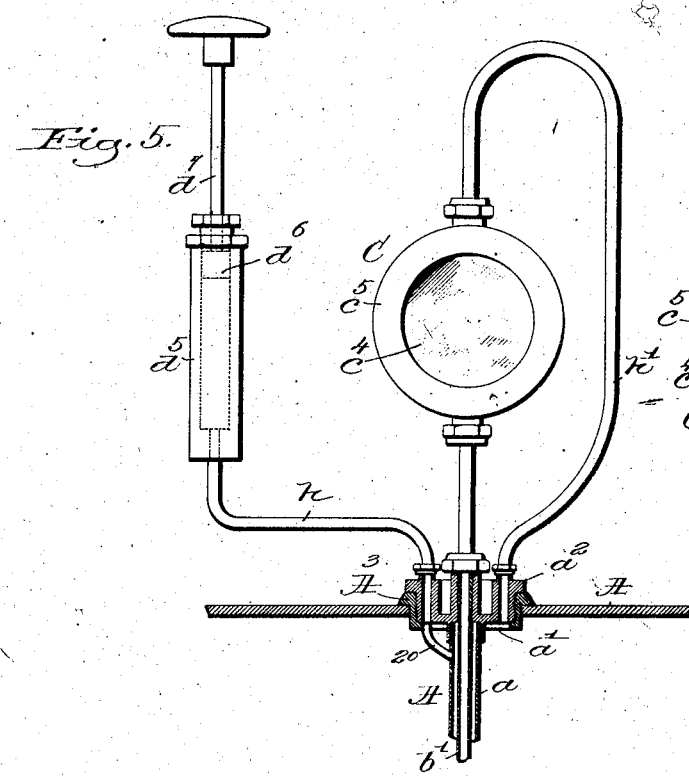

UNITED STATES PATENT OFFICE.

MORRIS MARTIN, OF MALDEN, MASSACHUSETTS, ASSIGNOR OF ONE-HALF TO GEORGE W. GREGORY, OF BOSTON, MASSACHUSETTS.

FLUID-GAGE.

No. 827,318.  Specification of Letters Patent.  Patented July 31, 1906.

Application filed February 23, 1906. Serial No. 302,418.

*To all whom it may concern:*

Be it known that I, MORRIS MARTIN, a citizen of the United States, residing in Malden, county of Middlesex, and State of Massachusetts, have invented an Improvement in Fluid-Gages, of which the following description, in connection with the accompanying drawings, is a specification, like characters on the drawings representing like parts.

This invention relating to fluid-gages has for its object the production of a gage that may be made to show at any distance from a tank the depth or quantity of fluid therein.

In accordance with my invention I employ, with a tank containing fluid the quantity of which it is desired to observe or ascertain, a tank-reservoir and an indicating-reservoir, and with these two reservoirs I employ means whereby I may transfer fluid from the tank-reservoir into the indicating-reservoir.

The tank-indicating-reservoir will be so proportioned with relation to the tank-reservoir and its communicating tube that when the contents of the tank-reservoir, which varies as the depth of the liquid in the tank varies, is temporarily transferred to the indicating-reservoir in making a test to indicate the depth of the fluid in the tank the level of the liquid coming into the indicating-reservoir will by its rising to certain defined lines of the scale or index of the indicating-reservoir show the depth of liquid in the tank, or, in other words, the capacity of the indicating-reservoir with relation to the capacity of the tank and of the tank-reservoir, in which stands a very small fine column of fluid, will be so proportioned that by transferring the column of fluid from the tank-reservoir into the indicating-reservoir, which has proper scale-marks, it may be seen what is the depth of the fluid in the tank and whether full or three-fourths, one-half, or one-fourth full. The ratio of the capacities of these reservoirs may vary as may be desired, and when the fluid which enters the indicating-reservoir has been observed it will be returned to the tank-reservoir in communication with the tank.

The transfer of fluid from one to the other reservoir is effected through a change in atmospheric pressure produced in any usual manner or, as will be described, preferably by a pump of some sort that will either exhaust the air from the indicating-reservoir that the fluid may rush therein from the tank-reservoir or by air-pressure on the top of fluid in the tank-reservoir, which will force the fluid therefrom into the indicating-reservoir.

Figure 1 shows part of a tank containing my novel tank-indicator coupled with my novel indicating-reservoir. Fig. 2 is a longitudinal section through the indicating-reservoir and pump. Fig. 3 is a top view of Fig. 2. Fig. 4 is a detail showing a valve in the lower end of the tank-reservoir. Fig. 4$^a$ shows the glass cover of the indicating-reservoir, one-half of which is shown as ground, that it may be marked or lined. Fig. 5 is a view of a modification wherein the pump is separated from the indicating-reservoir. Fig. 6 is yet another modification, and Fig. 7 shows a modification of the tank-reservoir and its communicating tube.

I provide a tank A of usual construction with a tank-reservoir A' (shown as a tube $a$) in communication with the fluid $A^2$ in the tank. The tank-reservoir in the form in which I have chosen to illustrate my invention (see Fig. 1) is suspended from a plate or head $a'$, sustained by a shoulder of a bushing $A^3$, soldered to the tank, said plate being held in operative position by a threaded ring $a^2$. The tank-reservoir may, however, be located at any point with relation to the tank so long as the reservoir is in communication with the fluid in the tank. The tank-reservoir has a communicating air-tube $b$, shown for convenience and cheapness of construction as located inside the tank-reservoir, (see Figs. 1, 4, 5, and 6;) but it may be located alongside said tube $a$, as shown in Fig. 7.

The outer end of the air-tube $b$ is shown as connected by one or more lengths of tubing or pipe $b'$ with the indicating-reservoir C wherever located. The indicating-reservoir will have a fluid capacity of sufficient size with relation to the tank-reservoir and its connected tube $b$ to receive whatever fluid may stand in the tank-reservoir, the tube $b$, and its connections at any time that a test is to be made to ascertain the depth of fluid in the tank, and the extent to which the indicating-reservoir will be filled at any test as indicated by the level of the fluid entering the indicating-reservoir and lining up with the scale-marks thereof will show the depth of fluid in the tank.

The indicating-reservoir C is composed, as shown, of a metal casting shaped to form a chamber c, into which is led the air-pipe b or a continuation thereof. The casting is threaded at $c^2$ and has a shoulder $c'$, that receives a packing $c^3$, and then a glass or other cover $c^4$, which is held in place by a threaded ring $c^5$, screwed onto the threaded part of the casting and closing the chamber liquid-tight.

If the tank A containing the liquid which is being exhausted in use is circular in vertical cross-section, the indicating-reservoir will also be circular in vertical cross-section, and if rectangular in vertical cross-section the indicating-reservoir may be of similar shape.

The indicating-reservoir of whatever shape will contain a scale 2, preferably of celluloid, (see Fig. 1,) the grade-lines of which will be separated at proper distances apart to designate a definite depth of liquid, as gasolene, in the tank, and the highest mark or line of the scale reached by the proportional amount of liquid transferred from the tank-reservoir into the indicating-reservoir will show the depth of the liquid in the tank at the time that the transfer is made.

The scale shown indicates full, three-fourths, one-half, and one-fourth full, and between these points other lines may be made, as on a rule, to indicate sixteenths, thirty-seconds, or other fractional amounts of depth of fluid in the tank of known capacity.

Should it be desired to show gallon-lines, one-half of the glass cover $c^4$ may be ground, as indicated in Fig. 4ª, and by adding the liquid to the tank one gallon at a time and making a test in the indicating-reservoir the level occupied by the liquid may be marked on said ground face of the glass, thus establishing the scale.

The lower end of the tubular tank-reservoir a in communication with the fluid in the tank has a controlled or sluggish inlet D, shown as a foot $d'$ at the lower end of said tube, and a piece of felt $d^2$ or other porous material, which will not be affected by gasolene and through which the fluid entering the tank-reservoir moves sluggishly, said material being shown as held between two perforated disks $d^3$. Instead, however, of the particular form of controlled or sluggish inlet so far described I may use a valve inside the air-tube b, (see Fig. 4,) said valve comprising a small rod 3, provided at its upper end with a head 4, having a loose fit in said tube and carrying at its lower end a button 5, that as the valve is raised by sucking air into the tube b will close promptly the end of the tank-reservoir A while the fluid in the tank-reservoir is being transferred into the indicating-reservoir to make a test.

When a test has been made, as will be described, and the liquid in the tank-reservoir has been transferred to the indicating-reservoir and exposed to view, the liquid in the indicating-reservoir will be returned to the tank-reservoir, where it will remain until it is desired to again make a test for sufficiency of fluid in the tank A.

There are several different ways in which the contents of the tank-reservoir may be transferred to the indicating-reservoir substantially instantaneously, and for this purpose I make use, as stated, of pressure. To effect this change in pressure in the plan adopted in Figs. 1 and 2, I have extended from the casing C a pump comprising a pipe $d^5$, having a piston $d^6$, provided with an operative handle $d^7$, by which to move the piston of the pump.

When the piston is moved from the position Fig. 1, full lines, into the dotted-line position, the air is instantly exhausted from the chamber c of the indicating-reservoir and the connected pipes, making a vacuum in said chamber, into which rushes fluid then in the tank-reservoir and its connected air-tube b. The fluid in the tank and surrounding the tank-reservoir, owing to the sluggish inlet or valve, does not follow into the tank-reservoir fast enough to at all interfere with exhibiting through the glass of the indicating-reservoir the fluid that was contained in the tube a of the tank-reservoir, said fluid so transferred being a proportional amount of fluid in the tank and indicating in the indicating-reservoir the depth or level of fluid in the tank A.

When the piston has been lifted for its full stroke and a test has been made, the piston will be pushed down to return the fluid from the indicating-reservoir to the fluid-reservoir. A test may be made once every minute, if desired; but usually a test made at one or two hours apart will suffice for all purposes.

The piston may be locked down (see Fig. 2) by a pin e on the piston, which may enter an annular groove in a segmental projection $e^2$ at the upper end $e'$ of the pump, said pin entering said groove as the piston-rod is turned axially when in its inward position, thus locking the piston; but instead of the particular locking device referred to I may employ any other well-known or suitable locking device.

While I prefer in most instances to use a suction-pump for transferring the contents of the tank-reservoir into the indicating-reservoir, yet it will be obvious that a blast of air generated in any usual manner, as by a force-pump, may be made to contact with the upper side of the column of fluid in the tank-reservoir and force the same from said reservoir into the indicating-reservoir, as I shall hereinafter describe, and yet be within the scope of my invention.

In Fig. 1 I have shown a small pipe g, that is led from the pump-cylinder above the piston to the tank, it serving to equalize the air-pressure on the piston. The head is shown as having a vent-passage $a^x$, that supplies air from the tank to the tank-reservoir above the fluid therein.

Fig. 2 also shows clearly a by-pass $a^{10}$, that opens into the pump above the piston when at its downstroke and into the indicating-reservoir, said by-pass equalizing the pressure in the indicating-reservoir when the piston $d^8$ is in its lowest position, the air-pressure in the tank at such time passing through the pipe $g$ into the pump and through the by-pass into the indicating-reservoir.

Instead of connecting the pump directly with the indicating-reservoir, as in Figs. 1 and 2, it may be arranged as in Fig. 5, where the pipe $h$ is led into the tank-reservoir A through the plate or head $a'$.

The fluid in the tanks of some cars and motor-boats is subjected to pressure, air being forced into the tank from a pump, and consequently it will be apparent when there is increased air-pressure in the tank that I do not need to supply means for producing such pressure, and consequently the pump so far described as forming a part of my gage where the tank is without air-pressure may be omitted, the usual pump of the car used for maintaining air-pressure in the tank being all that is necessary.

Fig. 6 shows my gage adapted for use with pressure-tanks, and, referring to that figure, it will be seen that the indicating-reservoir $C^x$ is connected by pipe $h^2$ with the pipe $b$ in the head $a'$ of the tank-reservoir A' in all particulars like the tank-reservoir previously described. The indicating-reservoir $C^x$ has added to it a valve-casing $n$, having a two-way cock $n'$, one way, 12, crossing the cock axially and the other way, 13, being longitudinally arranged and opening into the atmosphere through a hole 14 in the valve-casing.

The valve-casing is connected by a pipe $m$ with the tank A, and when the way 12 is operative an equilibrium of pressure is maintained and the level of the liquid in the tank and tank-reservoir is the same, and consequently the indicating-reservoir is filled only with air.

To make a test to ascertain the depth of fluid in the tank, the cock $n'$ will be turned to bring the way 13 into operation, and immediately as the excess of air-pressure is relieved in the indicating-reservoir the air in the tank passing through the hole 21 in the tank-reservoir above the level of the fluid therein acts on the top of the proportional amount of fluid in the tank-reservoir and transfers it very rapidly through pipe $h^2$ into the indicating-reservoir to be viewed.

While making the test the person manipulating the cock $n'$ by hand will watch for any incoming air-bubbles and will then immediately close the cock, and the position of the liquid then in the indicating-reservoir and covering the highest line of the scale will indicate the depth of fluid.

I have aimed to employ a standard size of tube for the tank-reservoir, which of course has to be longer or shorter as the depth of the tank varies, and to enable me to employ an indicating-reservoir of standard shape and size with all sizes of tanks I make the chamber $c$ of the indicating-reservoir of sufficient capacity to accommodate the longest tube $a$ used for the tank-reservoir of the largest tank used, and to proportionally change the capacity of the chamber in the indicating-reservoir I may apply to said chamber (see Fig. 2) one or more disks 16. The outermost disk or, it may be, the bottom of the chamber $c$ will support the celluloid disk or scale 2, on which will be marked or printed the proportional lines or scale of measurement adopted to designate the depth or quantity of fluid in the tank. These measurements are figured proportionally, as has been stated. The disks 16 and the scale 2 have a central hole, and they may be held in adjusted position in the chamber $c$ by a screw 17.

The central passage or hole through the air-tube $b$ of the tank-reservoir will be smaller than in the tube $a$, constituting part of said tank-reservoir, and preferably I place in the foot $d'$ of said tank-reservoir a greater or less number of disks 7, each having a hole and located above the sluggish inlet, said disks operating to lessen the fluid capacity of the foot. A greater or less number of these disks may be employed, according to the size of the tank with which the device is used.

I believe that I am the first to combine an indicating-reservoir with a tank and a tank-reservoir into which indicating-reservoir may be temporarily transferred to be measured the contents of the tank-reservoir, the latter containing a proportional part of the fluid in the tank; the fluid in the tank-reservoir being of the same depth as the fluid in the tank, the fluid coming into the indicating-reservoir showing the depth or quantity of liquid in the tank with which said tank-reservoir is in communication, and I desire to claim, broadly, these two reservoirs irrespective of their particular size, shape, or location with relation to each other and with whatever means employed to transfer the contents of one of said reservoirs into the other for the purposes herein described.

Having fully described my invention, what I claim as new, and desire to secure by Letters Patent, is—

1. An indicating-reservoir, a tank, and a tank-reservoir in communication therewith, combined with means to transfer a portion of the liquid contents of the tank-reservoir into said indicating-reservoir.

2. A tank-reservoir connected with a tank, an indicating-reservoir, communicating by a tube with the tank-reservoir, and means to remove the air from said tube and with it the liquid contents of the tank-reservoir, part of said contents entering said indicating-reservoir.

3. A tank-reservoir connected with a tank, said reservoir having a controllable inlet to retard the entrance of fluid into said tank-reservoir from the tank with which it is connected, an indicating-reservoir, a tube in communication with said tank-reservoir, and means to remove the air from said tube and with it the contents of said tank-reservoir, part of the latter entering said indicating-reservoir.

4. A tank-reservoir connected with a tank, an indicating-reservoir, a tube communicating with the tank-reservoir, means to remove the air from said tube and with it the contents of said tank-reservoir, part of the latter entering said indicating-reservoir, said means being thereafter operative to return the contents of the indicating-reservoir to the tank-reservoir.

5. An indicating-reservoir, a tank-reservoir communicating therewith, and a pump to transfer material in the tank-reservoir into said indicating-reservoir, and to thereafter return the contents of the indicating-reservoir to the tank-reservoir.

6. An indicating-reservoir, a tank-reservoir communicating therewith, a pump to transfer material from the tank-reservoir into said indicating-reservoir, and means to lock the pump in its inoperative position.

7. An indicating-reservoir, a tank, a tank-reservoir connected therewith, said tank-reservoir having a controllable inlet, and means to transfer material from the tank-reservoir into said indicating-reservoir.

8. An indicating-reservoir, a tank, a tank-reservoir connected therewith, said tank-reservoir having a sluggish inlet, and means to transfer part of the contents of the tank-reservoir into said indicating-reservoir.

9. A tank, a tank-reservoir in communication therewith, an indicating-reservoir communicating with the tank-reservoir a pump coöperating with said indicating-reservoir, and an air-pipe leading from the pump above its piston to the tank to equalize the air-pressure on the piston of said pump.

10. A tank, an indicating-reservoir having a surface that may be marked to designate depth of fluid in said tank, a tank-reservoir adapted to be connected with a tank, a communication between said reservoirs, and means to transfer part of the contents of the tank-reservoir into the indicating-reservoir.

11. A tank, a tank-reservoir communicating therewith and adapted to contain a portion of liquid bearing the same ratio to its total capacity as the quantity of liquid in the tank bears to its total capacity, an indicating-reservoir, and means to transfer from the tank-reservoir to the indicating-reservoir such a portion of the liquid in the former as will in the latter indicate the quantity of liquid in the tank.

12. In combination, a fluid-holding tank, an indicating-reservoir, a tank-reservoir communicating therewith, said tank-reservoir consisting of a tube containing a proportional amount of the fluid in the tank in the form of a column the top of which is level with the top of the fluid in the tank, and means to transfer the proportional amount of liquid in the tank-reservoir into the indicating-reservoir when the quantity of liquid in the tank is to be measured.

13. A tank, an indicating-reservoir, a pump associated therewith and a pipe connecting said reservoir and tank and conducting the fluid thereto, said pump when actuated transferring fluid from the tank into said indicating-reservoir, and thereafter returning said fluid through said pipe to the tank.

14. A tank, an indicating-reservoir having a detachable filling-disk to gage the capacity of said reservoir, combined with a tank-reservoir, and means to transfer part of the contents of said tank-reservoir into the indicating-reservoir.

15. A tank, a tank-reservoir having a chambered foot provided with a sluggish inlet, and having filling-plates to alter the capacity of the chamber in said foot, a connected indicating-reservoir, and means to transfer part of the contents of said tank-reservoir into said indicating-reservoir.

16. In apparatus of the class described, an indicating-reservoir having a transparent cover at one side and provided with an index, said reservoir having two ducts, one at the upper and the other at the lower part of said reservoir, combined with a pump detachably connected with said reservoir, and a pipe leading from said reservoir to a tank, said pump being adapted to fill and then empty said reservoir.

17. In apparatus of the class described, an indicating-reservoir, a tank-reservoir, a tank in connection with said tank-reservoir, means to transfer part of the contents of said tank-reservoir into said indicating-reservoir, and means to substantially prevent the entrance of fluid from the tank into the tank-reservoir while transferring the contents of the tank-reservoir into the indicating-reservoir.

In testimony whereof I have signed my name to this specification in the presence of two subscribing witnesses.

MORRIS MARTIN.

Witnesses:
GEO. W. GREGORY,
EVANGELINE C. BROWN.